UNITED STATES PATENT OFFICE.

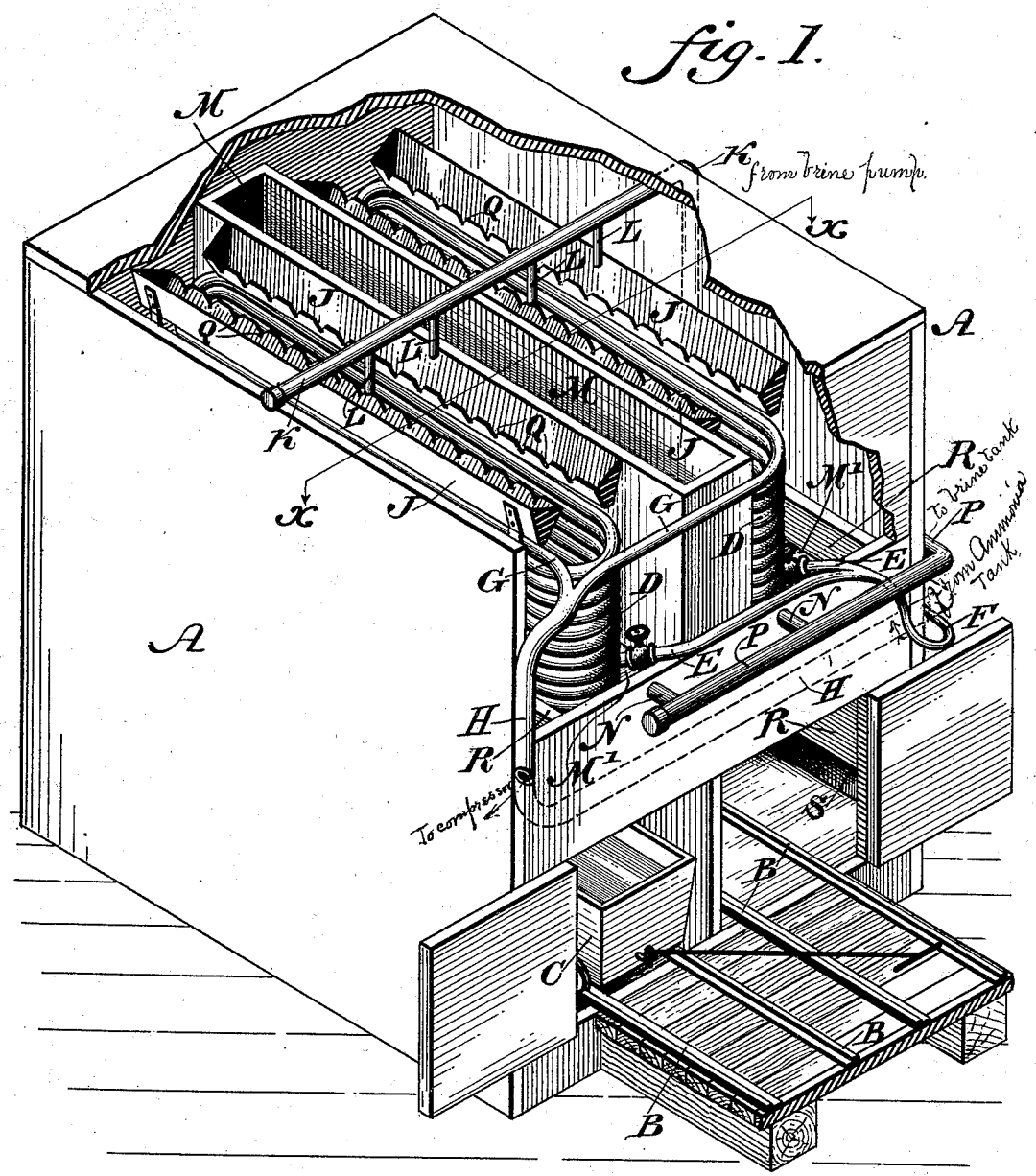

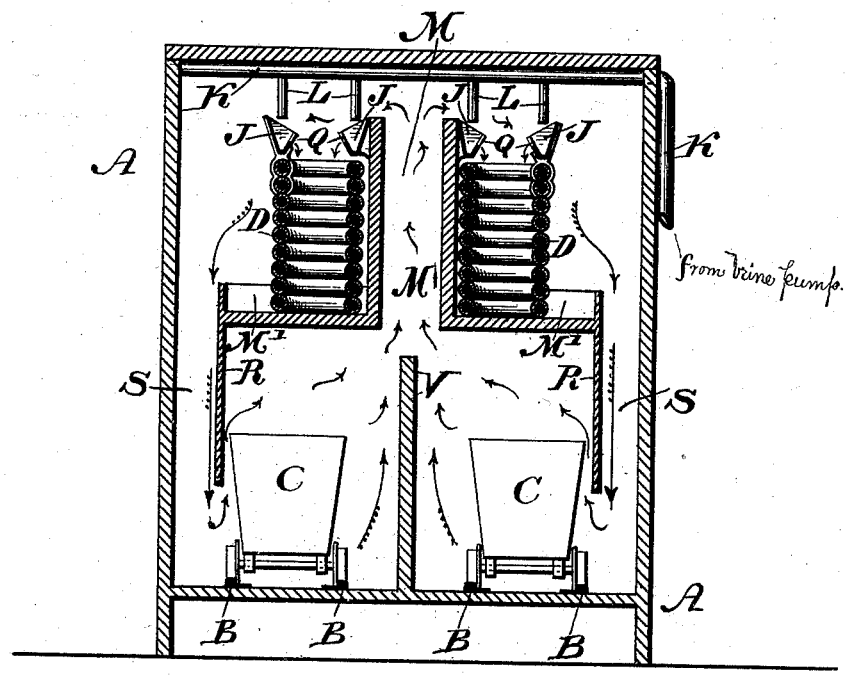

JOHN KURTZ, OF PHILADELPHIA, PENNSYLVANIA.

ICE-MACHINE.

SPECIFICATION forming part of Letters Patent No. 504,986, dated September 12, 1893.

Application filed September 15, 1892. Serial No. 445,977. (No model.)

*To all whom it may concern:*

Be it known that I, JOHN KURTZ, a citizen of the United States, residing in the city and county of Philadelphia, State of Pennsylvania, have invented a new and useful Improvement in Machines for Manufacturing Ice, which improvement is fully set forth in the following specification and accompanying drawings.

My invention consists of a machine for manufacturing ice embodying novel construction of parts as will be hereinafter set forth.

Figure 1 represents a perspective view partly broken away of an ice manufacturing machine embodying my invention. Fig. 2 represents a vertical section on line $x, x$, Fig. 1.

Similar letters of reference indicate corresponding parts in both the figures.

Referring to the drawings:—A designates a casing or house, whose floor is provided with tracks B, on which are placed the tanks C, the latter being adapted to primarily contain water which is to be formed into ice. The said floor is preferably raised above the ground or support on which said casing is sustained. Supported above said tanks, are coils of ammonia receiving pipes D, with one end of each of which are connected the branches E of the expansion pipe F, which leads from the ammonia tank. Connected with the other end of said coils D are the branches G, G, of the pipe H, which leads to the compressor, the latter and said tank not being shown, as they are well known. Above the coils, are troughs J, which are somewhat V-shaped and adapted to receive brine from the pipe K, and cause the same to flow over the coils D, said pipe leading from the pump of the brine tank, (both not being shown) and having branches L, which extend over said troughs, so as to discharge thereinto. Between the coils is a flue M, which occupies the upper portion of the house, and forms a communication with the lower portion thereof for discharging the heated matters or vapors that rise from the tanks C. Below the coils D are supported the drip troughs M' which receive the brine after flowing over the coils D, said troughs having connected with them the branches N of the pipe P, the latter leading to the brine tank, in order to return the brine in the troughs to said tank. Depending from the troughs M' are partitions R, which form with the sides of the house the flues S for the descent of the cold air from the coils D to the lower portion of the house. A partition V rises from the floor between the tanks C, so as to aid in directing the vapors to the flume M.

The operation is as follows: Ammonia is directed into the pipes D, and brine passed into the troughs J and the brine falls in streams therefrom, owing to the serrations Q in the upper edges of said troughs, said material then flowing over the pipes D, after which it drops into the troughs M'. The resultant cold air descends to the freezing chamber of the house A containing the tanks C. The heated matters from the said tanks C, and the portion of the house containing the same, enter the flue M, by which they are directed upwardly and condensed, and the air reduced to a freezing temperature, circulates around the tanks and through the house, whereby cold and congelation, and ice-forming is quickly accordingly occasioned. The brine after flowing over the pipe D, enters the troughs M' and is returned to the brine tank by means of the pipe P and branches N. The ammonia after passing through the pipes D, enters the branches G, and is then directed by the pipe H to the compressor.

The portion of the house occupied by the tanks C, is provided with doors which are closed during the formation of ice, and opened when the tanks, and consequently the ice is to be removed.

It will be noticed that as ice or frost forms on the pipes D, the brine washes off the same, and thus produces the cold air that descends to the freezing chamber containing the tanks C, this operation avoiding agitation, &c., as heretofore practiced.

Having thus described my invention, what I claim as new, and desire to secure by Letters Patent, is—

1. In an ice manufacturing machine, a casing, a partition rising from the floor of said casing, drip troughs supported in said casing, and ammonia coils supported in said casing, said drip troughs having depending partitions forming with the sides of the casing air passages, and also having between them a flue leading from the spaces on the sides of the floor partition, said parts being combined substantially as described.

2. In an ice manufacturing machine, a casing with a floor having tracks thereon, tanks movable on said tracks a partition between said tanks, ammonia coils above said tanks, brine drip troughs above and below said coils communicating with a brine tank, and partitions depending from said lower brine troughs forming with the sides of the casing cold air flues, said parts being combined substantially as described.

3. In an ice manufacturing machine, a casing, tanks movable on tracks on the floor of said casing, a partition rising from the floor between said tanks, ammonia coil pipes communicating with an ammonia supply tank, brine troughs supported above said coils, other brine troughs below said coils forming a vapor flue between the same, and having depending partitions forming with the sides of the casing cold air flues, and pipes communicating with said brine troughs and a brine supply tank, said parts being combined substantially as described.

JOHN KURTZ.

Witnesses:
JOHN A. WIEDERSHEIM,
A. P. JENNINGS.